United States Patent
Bachmaier et al.

(10) Patent No.: US 11,428,294 B2
(45) Date of Patent: Aug. 30, 2022

(54) FASTENING UNIT FOR FASTENING A CLAMPING ELEMENT TO A UNIT

(71) Applicant: Siemens Aktiengesellschaft, Munich (DE)

(72) Inventors: Georg Bachmaier, Munich (DE); Christian Bachmann, Munich (DE); Guillaume Pais, Munich (DE); Iason Vittorias, Munich (DE); Wolfgang Zöls, München-Lochhausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 373 days.

(21) Appl. No.: 16/618,526

(22) PCT Filed: May 15, 2018

(86) PCT No.: PCT/EP2018/062481
§ 371 (c)(1),
(2) Date: Dec. 2, 2019

(87) PCT Pub. No.: WO2018/224250
PCT Pub. Date: Dec. 13, 2018

(65) Prior Publication Data
US 2020/0132163 A1    Apr. 30, 2020

(30) Foreign Application Priority Data
Jun. 7, 2017   (DE) .................. 10 2017 209 597.0

(51) Int. Cl.
*F16H 27/02* (2006.01)
*F16H 29/02* (2006.01)
(Continued)

(52) U.S. Cl.
CPC ............ *F16G 11/101* (2013.01); *F16B 33/02* (2013.01); *F16H 19/0622* (2013.01); *F16H 2019/0695* (2013.01)

(58) Field of Classification Search
CPC .................... F16H 2019/0695; B25J 19/1045
See application file for complete search history.

(56) References Cited

U.S. PATENT DOCUMENTS

| 3,473,431 A | 10/1969 | King, Jr. .................. 411/344 |
| 3,636,594 A | 1/1972 | Faivre ..................... 24/298 |

(Continued)

FOREIGN PATENT DOCUMENTS

| AU | 516581 B2 | 6/1981 | ............. A61B 17/58 |
| CN | 203161966 U | 8/2013 | ............. F16G 11/04 |

(Continued)

OTHER PUBLICATIONS

Chinese Office Action, Application No. 201880038140.4, 8 pages, dated Sep. 30, 2020.

(Continued)

*Primary Examiner* — Jake Cook
(74) *Attorney, Agent, or Firm* — Slayden Grubert Beard PLLC

(57) ABSTRACT

Various embodiments include a fastening unit for fastening a tendon to a system. The fastening unit comprises: a head with a first opening; a shaft with a second opening and an external thread; and a channel extending from the first opening along the head to the second opening at least partly along the shaft. The external thread and the channel in each case accommodate the tendon.

8 Claims, 2 Drawing Sheets

(51) Int. Cl.
*F16H 29/20* (2006.01)
*F16G 11/10* (2006.01)
*F16B 33/02* (2006.01)
*F16H 19/06* (2006.01)

(56) References Cited

U.S. PATENT DOCUMENTS

| | | | |
|---|---|---|---|
| 7,073,406 B2* | 7/2006 | Garrec | F16H 19/06 74/89.36 |
| 7,389,974 B2* | 6/2008 | Garrec | B25J 9/104 254/398 |
| 9,803,719 B2 | 10/2017 | Lefebvre et al. | |
| 2004/0109738 A1 | 6/2004 | Ducker, III et al. | 411/82.1 |
| 2012/0123485 A1 | 5/2012 | Dehnad et al. | 606/304 |
| 2013/0195578 A1 | 8/2013 | Gleason | 411/367 |

FOREIGN PATENT DOCUMENTS

| | | | |
|---|---|---|---|
| CN | 104565203 A | 4/2015 | F16G 11/10 |
| DE | 1 212 132 B | 3/1966 | B61L 29/02 |
| DE | 202 01 392 U1 | 4/2002 | F16G 11/12 |
| DE | 10162091 A1 | 6/2003 | F16G 11/04 |
| DE | 203 11 370 U1 | 9/2003 | F16B 31/04 |
| FR | 1.265.577 A | 6/1961 | F16L 41/00 |
| JP | H06-221315 A | 8/1994 | F16B 31/02 |
| WO | 2018/224250 A1 | 12/2018 | F16B 33/02 |

OTHER PUBLICATIONS

European Office Action, Application No. 18727193.7, 9 pages, dated Nov. 15, 2021.
German Office Action, Application No. 10 2017 209 597.0, 7 pages, dated Apr. 6, 2018.
International Search Report and Written Opinion, Application No. PCT/EP2018/062481, 20 pages, dated Sep. 17, 2018.

* cited by examiner

FASTENING UNIT FOR FASTENING A CLAMPING ELEMENT TO A UNIT

CROSS-REFERENCE TO RELATED APPLICATIONS

This application is a U.S. National Stage Application of International Application No. PCT/EP2018/062481 filed May 15, 2018, which designates the United States of America, and claims priority to DE Application No. 10 2017 209 597.0 filed Jun. 7, 2017, the contents of which are hereby incorporated by reference in their entirety.

TECHNICAL FIELD

The present disclosure relates to fastening units. Various embodiments may include a unit for fastening a tendon to a unit and/or corresponding tendon-driven systems.

BACKGROUND

Tendon-driven systems are becoming increasingly important. Such systems are established in the area of robotics and mechatronics. For example, tendon-driven robot units having limbs which imitate the musculoskeletal system are known. The tendon-driven systems usually have actuators which pull at tendons or exert a tensile force thereon. As a result of the force action, the actuators additionally apply forces to the joints. In other words, force transmission is achieved from an actuator to a joint through the tendon.

However, an individual tendon can apply forces only in one direction. Therefore, two drive units are used for each individual degree of freedom or each individual joint. The arrangement of the two drive units is also known as agonist-antagonist arrangement in the context of human muscles.

In principle, what is always necessary here is the interaction or interplay of antagonistically acting muscles in order to be able to execute a movement. The agonist (player) executes one movement, whereas the antagonist (opposing player) ensures that the movement can also be effected in the opposite direction. Actuators or springs are used as drive units.

For example, in the case of a robot unit which is designed as a robot hand and is modeled on the human hand, an actuator can be used for closing a joint of a finger and an actuator (also called counteractuator) can be provided for opening the joint of the finger. In this respect, it is necessary to fasten the tendons to the actuators and the joints reliably in order to be able to move the joints in opposed directions. However, the fastening of a tendon is not standardized and should meet certain requirements.

For example, it is necessary that the fastened tendon remains under tension. Otherwise, the inadequate dynamics of the entire system have an adverse effect on performance. Furthermore, the material of the tendon may stretch under certain conditions, for example under high load, aging, or radiation. This leads to a reduction in or a loss of tension of the entire system.

Furthermore, it is necessary that the fastening of the tendon to the corresponding actuator or other allows adjustments of some parameters, such as degree of tension and length of the tendon, etc. In multiactuated systems, it may also be desirable for the length of the tendons of each actuator to be the same in order to simplify the modeling and regulation of the system.

Typically, knots are used for fastening the tendon to the actuator or the joint. However, the knots do not allow further or subsequent adjustment of the tension after the tendon has been fastened by means of a knot, since the tendon has a fixed length after fastening. Furthermore, it is difficult or impossible, in the case of certain materials and thicknesses of the tendon, to undo a knot previously made. Consequently, what may be necessary is that the knot has to be severed or cut through in order to undo it. Furthermore, it is only with difficulty that a knot can be realized in a certain length. Consequently, the length of the tendons of each actuator in multiactuated systems is not the same. In addition, use is made of, for example, springs in series, which, however, likewise involve severe disadvantages.

SUMMARY

The teachings of the present disclosure describe solutions to the technical problem of providing a fastening unit which is cost-effective, long-lasting, compact and user-friendly and can be adjusted in a simple and reliable manner. For example, some embodiments include a fastening unit (1) for fastening a tendon (20) to a unit (30), comprising: a. a head (11) having at least one first opening (12), b. a shaft (13) having at least one second opening (14) and at least one external thread (15), c. a channel (16), wherein d. the channel (16) extends from the at least one first opening (12) of the head (11) along the head (11) to the at least one second opening (14) of the shaft (13) at least partly along the shaft (13), wherein e. the at least one external thread (15) and the channel (16) is in each case designed for accommodating the tendon (20).

In some embodiments, there is a counterpart (17) having at least one internal thread (18) for fastening the tendon (20) to the unit (30), in which counterpart the shaft (13) can engage, the counterpart (17) being in particular a nut.

In some embodiments, if the shaft (13) engages in the counterpart (17), the tendon (20) is tightened.

In some embodiments, if the shaft (13) is disengaged from the counterpart (17), the tendon (20) is disengaged.

In some embodiments, the at least one external thread (15) is arranged on an end region of the shaft (13).

In some embodiments, the shaft (13) has two external threads (15) which are arranged on opposite end regions of the shaft (13).

In some embodiments, the two external threads (15) differ from one another in their diameters.

In some embodiments, the fastening unit (1) is produced at least in part by a 3D-printing method.

In some embodiments, the head (11) and the shaft (13) are designed as a bolt.

In some embodiments, the fastening unit (1) is driven in one direction (42) by a drive unit (40).

As another example, some embodiments include a tendon-driven system comprising: a. at least one tendon (20), the at least one tendon (20) being arranged on a unit (30), b. at least one fastening unit (1) for fastening the tendon (20) to the unit (30) as described above, and c. at least one drive unit (40) for driving the unit (30) in one direction (42), the at least one drive unit (40) being an actuator.

In some embodiments, if the at least one drive unit (40) is driven, the shaft (13) engages in the counterpart (17) and the tendon (20) is tightened.

In some embodiments, if the at least one drive unit (40) is not driven, the shaft (13) is disengaged from the counterpart (17) and the tendon (20) is disengaged.

BRIEF DESCRIPTION OF THE DRAWINGS

In the following description, example embodiments of the teachings herein are further described in the present case with reference to the following figures.

DETAILED DESCRIPTION

Figure 1:
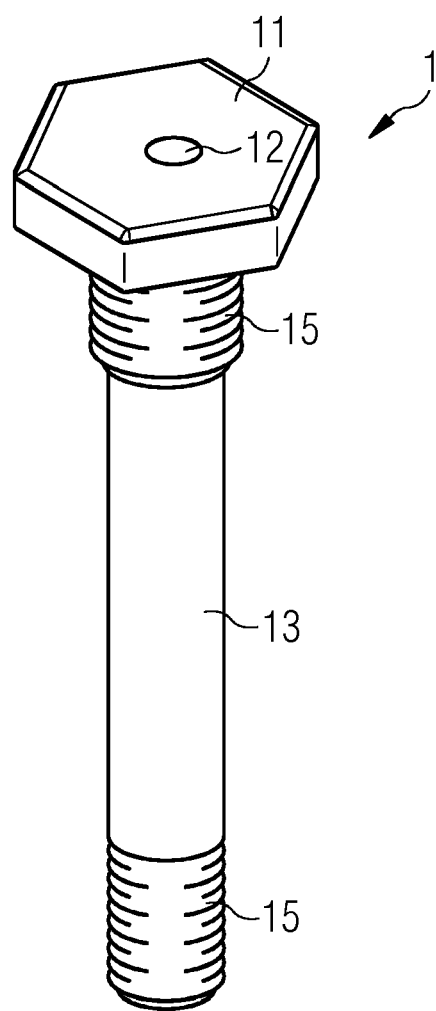
FIG. 1 shows a detailed view of a fastening unit incorporating teachings of the present disclosure.

Some embodiments of the teachings herein include a fastening unit for fastening a tendon to a unit, comprising:
a. a head having at least one first opening,
b. a shaft having at least one second opening and at least one external thread, and
c. a channel, wherein
d. the channel extends from the at least one first opening of the head along the head to the at least one second opening of the shaft at least partly along the shaft, wherein
e. the at least one external thread and the channel is in each case designed for accommodating the tendon.

In some embodiments, the fastening unit may be suitable for fastening or fixing a tendon to a unit. The fastening can therefore also be referred to as fixing. The tendon is, for example, a cord and has a certain stiffness or strength. However, it is not restricted to a cord. Conventional Dyneema cords or Vectran cords can be used for this purpose. The cords can be flexibly chosen by a user, depending on the specific application. The unit is, for example, designed as a joint unit, such as a robot unit, or any other unit, such as a drive unit.

The head of the fastening unit can also be referred to as upper subunit and is accordingly arranged above the shaft of the fastening unit. The shaft can consequently also be referred to as lower subunit. The diameter of the head can be larger than the diameter of the shaft. Furthermore, the head can have a round shape, whereas the shaft has a rod-like shape.

A continuous channel is arranged between the head and the shaft, with the result that the tendon can pass into the head through the opening of the head and can pass out of the opening of the shaft. For example, a cord is threaded through the channel in one step and wrapped around the external thread of the shaft in a further step.

In some embodiments, the fastening unit incorporating the teachings herein has a very simple and user-friendly design. The tendon can be tightened as desired and thus fixed under a tension and/or fastened to the unit. Conversely, the tension can also be reduced and the tendon correspondingly relaxed or completely disengaged. In other words, the fastening can be reestablished at any time in a simple manner. It is accordingly reversible.

By means of the degree or the strength of the tensile force, it is possible to influence and alter the tension of the tendon. Therefore, the tension of the tendon and the length thereof before and after fastening can be adapted or adjusted to the requirements of the user or other circumstances as desired and in an efficient manner. The fastening unit is accordingly also adjustable.

In some embodiments, the fastening unit additionally comprises a counterpart having at least one internal thread for fastening the tendon, in which counterpart the shaft can engage, the counterpart being in particular a nut. Accordingly, the shaft having the external thread is provided with a corresponding counterpart having an internal thread or counterthread. For example, a cord has already been threaded through the channel and wrapped around the external thread of the shaft and can additionally be tightened by the counterpart.

In some embodiments, if the shaft engages in the counterpart, the tendon is tightened.

In some embodiments, if the shaft is disengaged from the counterpart, the tendon is disengaged. Accordingly, the threads of the shaft and the counterpart can engage with one another. As a result of the threads engaging with one another, a force acts on the tendon. The tendon is clamped and is held firmly. Otherwise, the holding force is reduced as a result of the threads disengaging or sliding apart from one another. The tendon is relieved or relaxed.

In some embodiments, the at least one external thread is arranged on an end region of the shaft. Accordingly, the external thread is, in particular, mounted on the end facing head. This region has been found to be particularly advantageous with respect to the stability and reliability of fastening.

In some embodiments, the shaft has two external threads which are arranged on opposite end regions of the shaft. Accordingly, what is provided in addition to the first external thread is a second external thread. The first external thread serves for the fixing of the tendon. By contrast, the second external thread serves for the fastening of the tendon to any unit, such as a joint unit or drive unit. As a result, the fastening unit can advantageously be flexibly used in any system.

In some embodiments, the two external threads differ from one another in their diameters. Accordingly, the diameter of the first external thread is greater than the diameter of the second external thread. In some embodiments, other diameters can be flexibly chosen. For example, the larger diameter can be used as a stop.

In some embodiments, the fastening unit is produced at least in part by a 3D-printing method. Accordingly, part of the fastening unit or the entire fastening unit is constructed in a layer-by-layer manner by means of 3D printing. 3D printing allows in particular a rapid manufacture. However, the fastening unit is not restricted to this manufacturing method.

In some embodiments, the head and the shaft are designed as a bolt. Accordingly, the fastening unit is designed as a conventional bolt without the counterpart. The counterpart for the bolt can accordingly also be designed as a matching nut.

In some embodiments, the fastening unit is driven in one direction by a drive unit. Accordingly, what is provided is a drive unit which drives the tendon in one direction. The tendon fastened to the unit is driven in one direction. The unit moves correspondingly in the same direction. As a result, a movement can be carried out in one direction. For example, an actuator or some other drive unit can be used for closing a joint of a finger or be provided for opening the joint of the finger.

Some embodiments include a tendon-driven system comprising:
a. at least one tendon, the at least one tendon being arranged on a unit,
b. at least one above-described fastening unit for fastening the tendon to the unit,
c. at least one drive unit for driving the unit in one direction.

Accordingly, one or more fastening units can be arranged a joint unit. Usually, an agonist-antagonist arrangement is desirable in order to be able to realize a movement in opposed directions. To this end, two tendons, such as cords, can be arranged on a joint unit and fastened thereto by means of the fastening units. The two tendons are driven by two actuators. In some embodiments, one drive unit can drive one tendon in one direction and one drive unit can drive the other tendon in the opposite direction. Actuators or springs can, for example, be used as drive units.

FIG. 1 shows a fastening unit 1 which is composed of two subunits 11, 13. The upper subunit 11 can be referred to as the head and the lower subunit 13 as the shaft. The fastening unit can be produced by means of 3D printing or other manufacturing methods. The subunits 11, 13 each have an opening 12, 14. In some embodiments, the head 11 has a plurality of edges and is flat. The shaft 13 is arranged below the head 11 and is rod-like. Furthermore, the shaft 13 has a thread segment 15. For example, an external thread 15 is arranged on an end region of the shaft 13. The shaft 13 can correspondingly engage in an internal thread 18 of a counterpart 17. The fastening unit 1 can, for example, be a bolt.

Figure 2:
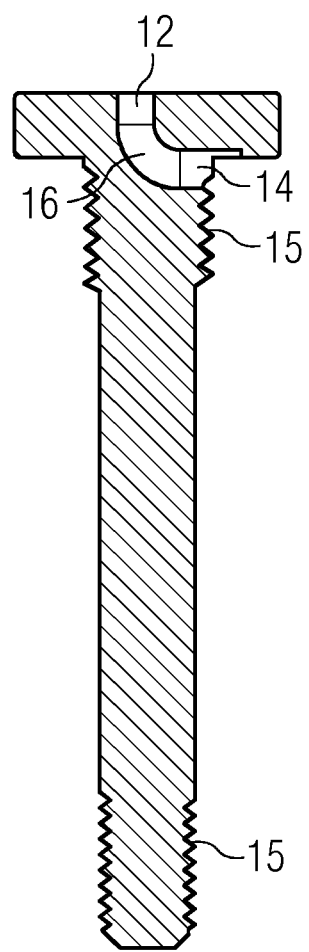
FIG. 2 shows a detailed view of a channel of the fastening unit incorporating teachings of the present disclosure.

Between the two openings 12, 14, a channel 16 stretches continuously from the first opening 12 through the head 11 and through the shaft 13 up to the second opening 14. The channel 16 is depicted in detail in FIG. 2. A tendon 20 (not shown) can be threaded into the first opening 12, through the channel 16 and out of the second opening 14. Furthermore, the tendon 20 can subsequently be wrapped around the external thread 50. The tendon 20 can, for example, be a cord.

As a result of the thread segments 15, 18 of the shaft 13 and the counterpart 17 engaging with one another, the tendon 20 is tightened and is held firmly. In other words, it is fixed. Furthermore, the tendon 20 is disengaged as a result of the thread segments sliding apart from one another.

Figure 3:
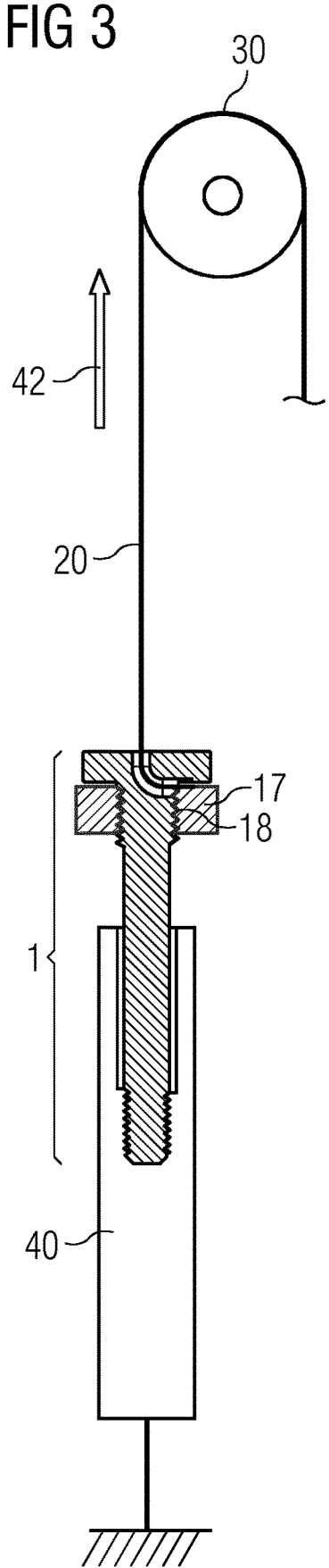
FIG. 3 shows a top view of a tendon-driven system incorporating teachings of the present disclosure.

FIG. 3 shows a tendon-driven system. The tendon-driven system comprises a fastening unit 1 by means of which a cord 20 is fastened to a unit 30. A first cord 20 is fastened to a joint unit and/or a drive unit by a first fastening unit 1. Furthermore, a second cord 20 is fastened to the joint unit and/or the drive unit by a second fastening unit 1. The second cord is indicated by the dashed line. The fastening units 1 allow a reversible, adjustable and reliable fastening.

The two cords 20 are moved in opposed directions by respective drive units 40. The first drive unit 40 drives the first cord 20 and thus also the joint unit 30 in one direction 42 and the other, second drive unit 40 drives the second cord 20 and thus also the joint unit 30 in the opposite direction.

If the shaft 13 has two external threads as per FIG. 1, the cords 20 are fixed on one end of the shaft 13 via a first thread segment 15, and on the associated drive unit 40 on the other end of the shaft 13 via a second thread segment 15.

What is claimed is:

1. A fastening unit for fastening a tendon to a system, the fastening unit comprising:
   a head with a first opening;
   a shaft with a second opening and an external thread;
   a channel extending from the first opening along the head to the second opening at least partly along the shaft;
   wherein the external thread and the channel in each case accommodate the tendon; and
   a counterpart with an internal thread for fastening the tendon to the system;
   wherein the counterpart engages the shaft;
   wherein, if the shaft engages the counterpart, the tendon is tightened; and
   wherein if the shaft is disengaged from the counterpart, the tendon is disengaged.

2. The fastening unit as claimed in claim 1, wherein the external thread is disposed on an end region of the shaft.

3. A fastening unit for fastening a tendon to a system, the fastening unit comprising:
   a head with a first opening;
   a shaft with a second opening and an external thread; and
   a channel extending from the first opening along the head to the second opening at least partly along the shaft;
   wherein the external thread and the channel in each case accommodate the tendon; and
   wherein the shaft includes two external threads arranged on opposite end regions of the shaft.

4. The fastening unit as claimed in claim 3, wherein the two external threads have different diameters.

5. The fastening unit as claimed in claim 1, wherein the fastening unit is produced at least in part by a 3D-printing method.

6. The fastening unit as claimed in claim 1, wherein the head and the shaft comprise a bolt.

7. The fastening unit as claimed in claim 1, further comprising a drive unit driving the fastening unit in a first direction.

8. A tendon-driven system comprising:
   a tendon arranged on a system;
   a fastening unit for fastening the tendon to the system, the fastening unit comprising:
      a head with a first opening;
      a shaft with a second opening and an external thread; and
      a channel extending from the first opening along the head to the second opening at least partly along the shaft;
   wherein the external thread and the channel in each case accommodate the tendon; and
   a drive unit for driving the system in a first direction;
   wherein if the drive unit is driven, the shaft engages in a counterpart and the tendon is tightened; and
   wherein if the drive unit is not driven, the shaft disengages from the counterpart and the tendon is disengaged.

* * * * *